US012706694B2

(12) United States Patent
McCarthy et al.

(10) Patent No.: US 12,706,694 B2
(45) Date of Patent: Aug. 11, 2026

(54) GEOLOCATION-AIDED UNIQUE SIGNAL RECOGNITION

(71) Applicant: HawkEye 360, Inc., Herndon, VA (US)

(72) Inventors: Nick McCarthy, Herndon, VA (US); Darek Kawamoto, Herndon, VA (US)

(73) Assignee: HawkEye 360, Inc., Herndon, VA (US)

( * ) Notice: Subject to any disclaimer, the term of this patent is extended or adjusted under 35 U.S.C. 154(b) by 0 days.

(21) Appl. No.: 18/843,666

(22) PCT Filed: Mar. 6, 2023

(86) PCT No.: PCT/US2023/014628
§ 371 (c)(1),
(2) Date: Sep. 3, 2024

(87) PCT Pub. No.: WO2023/168119
PCT Pub. Date: Sep. 7, 2023

(65) Prior Publication Data
US 2025/0175283 A1 May 29, 2025

Related U.S. Application Data

(60) Provisional application No. 63/316,926, filed on Mar. 4, 2022.

(51) Int. Cl.
*H04L 1/00* (2006.01)
*G06N 3/08* (2023.01)

(52) U.S. Cl.
CPC .......... *H04L 1/0071* (2013.01); *H04L 1/0045* (2013.01); *G06N 3/08* (2013.01)

(58) Field of Classification Search
CPC ........ G01S 7/021; G06N 3/0455; G06N 3/09; G06N 3/0442; G06N 3/0464; G06N 3/047;
(Continued)

(56) References Cited

U.S. PATENT DOCUMENTS 11,181,893 B2 * 11/2021 Cella ....................... G06F 3/067
12,316,392 B1 * 5/2025 O'Shea ................ G06N 3/0442
(Continued)

OTHER PUBLICATIONS

International Search Report issued Sep. 21, 2023 in International Application No. PCT/US2023/014628.
(Continued)

*Primary Examiner* — Justin R Knapp
(74) *Attorney, Agent, or Firm* — Sughrue Mion, PLLC

(57) ABSTRACT

Methods and systems, including computer programs encoded on a computer-readable medium, are described for implementing geolocation-aided unique signal recognition. For example, a system obtains radio frequency (RF) signals emitted by one or more emitters and processes the RF signals using a deinterleaving operation that integrates geo-location information for individual receivers that detect at least one of the RF signals. A grouping of RF signals that indicate an association with a particular one of the emitters is determined based on the deinterleaving operation. The system i) generates iterative sets of labeled training data with labels for RF signal inputs derived from the signal grouping and ii) generates an RF signal recognition model from machine-learning performed using the iterative sets of labeled training data. Based on detection of an RF signal by a receiver, the RF recognition model determines a geolocation of a corresponding emitter that emits a particular RF signal.

16 Claims, 10 Drawing Sheets

(58) Field of Classification Search
CPC ...... G06N 3/086; G06N 3/088; G06N 3/0895; H04L 1/0045; H04L 1/0071; H04B 17/30
See application file for complete search history.

(56) References Cited

U.S. PATENT DOCUMENTS

| | | | | |
|---|---|---|---|---|
| 12,373,715 | B2 * | 7/2025 | West | G06N 3/094 |
| 2020/0363492 | A1 | 11/2020 | Schiffmiller | |
| 2021/0025962 | A1 | 1/2021 | Smyth et al. | |
| 2021/0168033 | A1 | 6/2021 | Whitefield et al. | |
| 2021/0326642 | A1 | 10/2021 | Gillian et al. | |
| 2022/0044091 | A1 | 2/2022 | Sundararajan et al. | |
| 2022/0264525 | A1 | 8/2022 | Simon et al. | |
| 2023/0359896 | A1 * | 11/2023 | Samples | G06V 20/52 |

OTHER PUBLICATIONS

Written Opinion of the International Searching Authority issued Sep. 21, 2023 in International Application No. PCT/US2023/014628.

International Search Report and Written Opinion of the International Searching Authority dated Sep. 20, 2024 in Application No. PCT/US24/20727.

* cited by examiner

GEOLOCATION-AIDED UNIQUE SIGNAL RECOGNITION

CROSS-REFERENCE TO RELATED APPLICATIONS

This is a National Stage of International Application No. PCT/US2023/014628 filed Mar. 6, 2023, claiming priority based on U.S. Provisional Application No. 63/316,926, filed Mar. 4, 2022.

TECHNICAL FIELD

The following disclosure relates generally to systems and techniques for radio signal recognition.

BACKGROUND

Various electrical devices emit radio frequency (RF) signals (also referred to as radio signals). For example, communications radios, emergency safety beacons, radars, television broadcast towers, wireless access points, cellular towers, cellular phones, and satellite phones, among other radio emitters, transmit radio signals that can be received by other devices. To determine locations of these signal emitters, localization techniques often rely on some form of multilateration based on a difference measurement of time or frequency of a signal to several receivers. Typically, detectors and timing and frequency estimation techniques are designed for a specific signal of interest.

SUMMARY

The present disclosure describes techniques for implementing geolocation-aided unique signal recognition ("GA-USR"). More specifically, a unique signal recognition technique is described that uses geolocation data to enhance labeled datasets for training a signal analysis engine to recognize and locate certain RF signal emitters. To perform its analytical functions, the signal analysis engine combines techniques for geolocation processing, RF machine-learning (RFML), and DSP processing. For example, the signal analysis engine is configured to determine groupings of RF energy (e.g., radio signals) within a single wideband collection for a given emitter or subset of emitters that emit RF energy.

The signal analysis engine uses the combined techniques to derive a training dataset in response to pre-processing of the groupings of RF energy. The analysis engine employs a unique preprocessing approach that uses different combinations of geolocation, deinterleaving, and assignation techniques to derive an initial training dataset. The signal analysis engine uses at least the initial training dataset to ultimately train and generate an RF signal recognition data model ("RF recognition model"). Here, such "model" may be a trainable system comprising one or more deep learning models and other components that may not need training. To derive an initial training dataset, the signal analysis engine may first operate in a mode absent the RF recognition model. The RF recognition model is optimized to perform accurate signal recognition of emitter-based RF energies. The optimization of the RF recognition model is based in part on the iterative processing of subsequent training dataset(s) to yield more robust sets of labelled inputs. This iterative processing combines all (or some) of the techniques employed at the signal analysis engine with increasing reliance on the RF recognition model as the labelled datasets become more robust.

Implementations of the disclosed techniques include methods, apparatus, computer program products and systems for performing the above-described actions. Such a computer program product is embodied in a non-transitory machine-readable medium that stores instructions executable by one or more processors. The instructions are configured to cause the one or more processors to perform the above-described actions. One such system includes one or more sensing devices (e.g., satellite detectors, or other aerial or terrestrial platforms with radio signal detection capabilities), and one or more computing units that are configured to perform the disclosed actions upon receiving radio signals from the sensing device(s).

The subject matter described in this specification can be implemented in particular embodiments so as to realize one or more of the following advantages. The disclosed system performs identification by emitter of RF collected signals based on previously detected and labeled signals. Relative to other conventional approaches, the data processing techniques disclosed in this specification allow for realizing improved geolocation as a benefit of the system as well as increases in the speed with which geolocations can be delivered or provided, for example, as an output to a user.

To provide the improved geolocations, the disclosed system uses deinterleaving and geolocation-aided deinterleaving techniques to preprocess sets of RF signals. Each of these techniques allow for deriving robust labeled training sets that are processed to train and generate an RF recognition model. The training may be on unlabeled data as well. The model is trained to perform identification by emitter at least based on the labeled inputs of the training sets. The training may be by supervised, semi-supervised and unsupervised. The system can combine the RF recognition model with the original deinterleaving and geolocation-aided deinterleaving techniques. The combination allows for improving the full analytical pipeline, including the deinterleaving techniques, such that the system can yield more accurate emitter identifications and geolocations.

To provide the increased speed, the disclosed system can first identify or tag one or more high-priority emitters. In response to determining a set of high-priority emitters, the system can: i) access a listing of high-priority emitters, ii) use the RF recognition model to identify or determine RF bursts that are emitted by one or more high-priority emitters, and iii) prioritize RF signal preprocessing operations with respect to those high-priority emitters. The system can also prioritize certain data transfer operations and allocations of geolocation processing resources such that geolocations for high-priority emitters are completed faster (e.g., much faster) than a non-priority based approach. The determinations for identifying or recognizing which RF bursts belong to high-priority emitters may be based on probability or likelihood estimations.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that are executable by a data processing apparatus to cause the apparatus to perform the actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers and designations in the various drawings indicate like elements.

DETAILED DESCRIPTION

Figure 1:
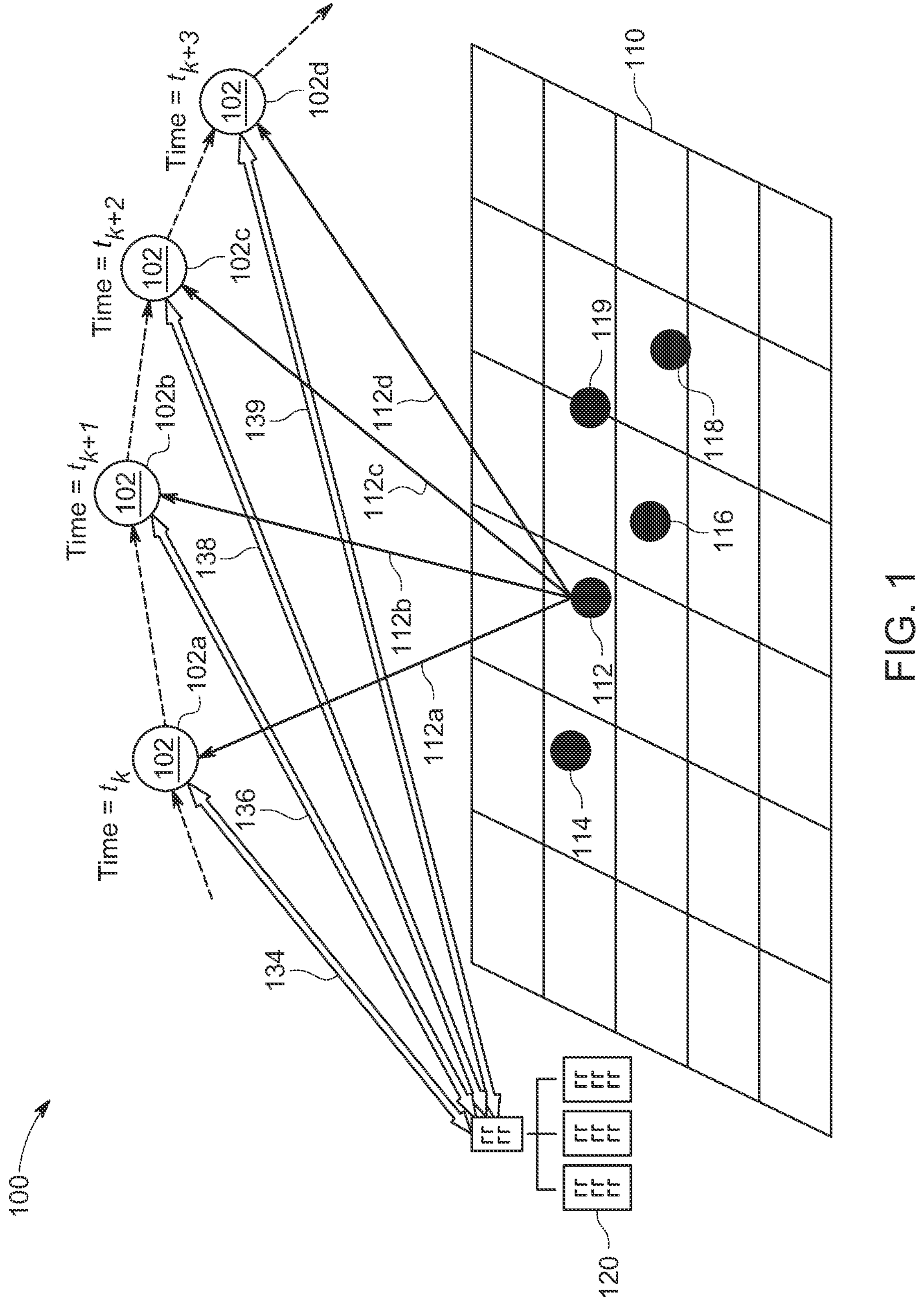
FIG. 1 is a block diagram showing an example computing architecture for implementing geolocation-aided unique signal recognition.

Radio geolocation, also referred to simply as geolocation, refers to operations to locate a radio emitter (e.g., a signal source emitting RF signals) based on analyzing RF signals emitted by the radio emitter. Geolocation is useful for radio spectrum access enforcement, commercial radio use analytics, and security applications where determination of the location of an emitter sending radio signals is important. In some cases, locations of radio emitters are determined using one or more of time of arrival, frequency of arrival, time-difference and frequency-difference of arrival combined with reverse multilateration. These techniques may rely on knowing certain characteristics about the underlying signal (RF signal) transmitted from an emitter, or they may rely on correlating information collected by multiple sensing devices simultaneously or by one or more sensing devices at multiple points in time.

Some geolocation systems apply specific signal analysis techniques and applications to localize various signal types of interest. For example, a geographic information system (GIS) that employs such techniques is operable to connect people, locations, and data using interactive maps. These systems often leverage data-driven styles and intuitive analysis tools to enable data connections and support localization efforts for signals and emitter detection. In some cases, an example GIS implements methods of storing a user's workspace information and relevant application data as well as tracking actions taken to execute a given document or project. Other systems may be operable to display multiple types of geospatial data on a map.

Some geolocation systems include, or are integrated with, Automated Information System (AIS) platforms that employ advanced filtering and search capabilities to view or track position and movement information for various nautical vessels across different geographic locations. For example, the conventional AIS platforms can generate an alert to indicate when an entity or emitter with ID: "123456789" is detected within "Boundary_Name_1." Some of these platforms can provide live as well as historical activity views of one or more vessels and may include an example watch list that allows for monitoring and accessing information about items of interest, such as a group of vessels A, B, and C.

In this context, an approach or framework for implementing GA-USR is described. The unique signal recognition technique uses geolocation data to enhance labeled datasets for training a signal analysis engine to recognize and locate certain RF signal emitters. The framework can address problems or challenges with compiling, iteratively improving, and expanding truth-labeled datasets for USR applications that involve determining geolocations of identified emitters based on detected emitted RF energy. One such challenge is temporary proximity between distinct emitters using similar equipment to transmit RF energy. The signal analysis engine can use the RF recognition model to separate substantially similar emissions that are emitted from emitters that are located in close proximity to one another (e.g., within a mile), whereas traditional digital signal processing (DSP) techniques and geolocation techniques may not disambiguate the emitters reliably. The disclosed GA-USR techniques can leverage RF collections for emitters when they are geospatially separated or distinguishable via traditional DSP techniques to train the RF recognition model and then apply the recognition model to reliably label emissions when those emissions are indistinguishable by use of geolocation or traditional DSP techniques.

Another challenge is reducing latency with which the signal analysis engine can provide geolocations for high-priority emitters, particularly for certain cases in which training may be time sensitive. The signal analysis engine can use the RF recognition model to apply, for example, a priority technique to selectively perform preprocessing, data transfer, and geolocation processing for RF energy belonging to high-priority emitters. The signal analysis engine can then deliver geolocation information for high-priority emitters much faster than by processing without the benefit of the priority technique, which allows for prioritizing based on the RF recognition model.

As noted above, an example signal analysis engine is operable to determine groupings of RF energy (e.g., radio signals) within a single wideband collection for one or more emitters that emit RF energy. Based on the disclosed framework, the signal analysis engine can fuse the RF groupings with a set of labeled geospatial data to generate an initial set of labeled inputs. The labeled inputs are iteratively processed to generate an RF recognition model that is optimized for accurate signal recognition of emitter-based RF energies.

FIG. 1 illustrates an example of a system 100, which includes a computing architecture for implementing geolocation-aided unique signal recognition. The system 100 is for determining emitter locations, according to one or more implementations of the signal analysis engine. The system 100 includes a sensing device 102, an area 110 that includes a plurality of emitters that are indicated by candidate emitter locations 112, 114, 116, 118 and 119, and a receiver station 120.

In some implementations, the sensing device 102 is a mobile apparatus, such as spacecraft, aerial vehicles, terrestrial vehicles, or some or suitable mobile platforms capable of movement along a predefined trajectory. For example, the sensing device 102 is a satellite in some implementations. Alternatively, the sensing device 102 can be a car or truck, or a sensing device installed on the car or truck. Alternatively, the sensing device 102 is (or installed on) an aerial vehicle such as an airplane, or unmanned aerial vehicle (UAV) such as a drone or a balloon. Sensing device 102 generally includes hardware, software and processing logic to detect and record radio signals emitted by signal emitters at emitter locations 112, 114, 116, 118, and 119. For example, the sensing device 102 is a radio signal receiver in some implementations. In general, a distance between the sensing device 102 and the emitters of area 110 varies due to movement of the sensing platform that includes the sensing device 102.

The sensing device 102 includes one or more radio signal receivers, also referred to as sensors, which are configured to receive radio signals from emitters. In some implementations, the sensors correspond to radio frequency (RF) antennas coupled to transponders and/or network interfaces on board the sensing device. The sensing device 102 also includes other hardware components, such as a digitizer (e.g., an analog to digital converter, or ADC) that converts the received analog radio signals to a digital format, one or more processors, and memory that stores instructions corresponding to operations performed by the sensing device, and also stores the radio signal data and/or processed information generated based on the radio signal data.

Although a single sensing device 102 is shown, in some implementations the system 100 includes a different number of sensing devices. For example, the system 100 can include two, three, or any other suitable number of sensing devices. In such implementations, different pairwise emissions can be compared between versions of delays and sensor instances for computing distance metrics and evaluating candidate locations. For example, the system 100 can pairwise compare delays within one emitter, the same delay within multiple emitters, or differing delays between multiple emitters. System 100 can be configured such that all or multiple pairwise copies can be evaluated using the techniques described herein for assessing data describing distances, candidates, locations, or combinations of each.

In some implementations, the area 110 is a geographic region on the Earth's surface. In some implementations, the area 110 is a region of space that is proximate to the Earth's surface, e.g., at a height of a few feet to a few tens or hundreds of feet above ground. The emitters corresponding to the candidate locations 112, 114, 116, 118 and 119 include one or more of emergency safety beacons, radars, ships or maritime vessels, television broadcast towers, wireless access points, wireless transmitters, cellular towers, cellular phones, and satellite phones, among other radio emitters. In some implementations, different emitters corresponding to the candidate locations 112, 114, 116, 118 and 119 are of different types. In other implementations, the emitters corresponding to the candidate locations 112, 114, 116, 118 and 119 are of the same type. Each emitter includes hardware, such as one or more communications radios, which transmit radio signals that can be received by other devices, such as the sensing device 102.

The sensing device 102 can be a mobile device or a stationary device. For example, some implementations can include multiple sensing devices 102 that are stationary, whereas some other implementations can include a single device that might be mobile. The sensing device 102 includes a sensor that moves relative to the earth's surface. In some implementations, the sensor moves along a precisely known path, movement trajectory, or orbit. FIG. 1 illustrates an example of system 100 in which a sensing device 102 is moving along a defined orbit. The sensing device 102 detects signal emissions from an emitter on the ground at the various locations of area 110 during movement along an orbital path. This well-modeled or measured trajectory information facilitates the computation of how such motion path affects the time and frequency offsets of patterned emissions received during the motion.

Depending on the type of the sensing device 102, the movement of the sensing device is in space in some implementations, or on the terrestrial surface in some other implementations. In implementations where the sensing device 102 is an aerial platform, the sensing device follows one or more trajectories through space. For example, the sensing device can be a satellite that follows an orbital trajectory with respect to the Earth's surface. Alternatively, in implementations where the sensing device is a terrestrial vehicle, the sensing device follows a trajectory on the ground. For example, the sensing device can be a car or a truck that travels on the Earth's surface, either along marked roads or on unmarked areas. As another example, the sensing device can be a boat or a ship that travels on water, such as the oceans.

During movement of the sensing device 102 along its trajectory, the sensing device receives radio signals from one or more emitters located at one or more of the candidate locations 112, 114, 116, 118 and 119. For example, during a known time interval, the sensing device 102 receives radio signals 112*a*. 112*b*, 112*c*, and 112*d* from an emitter at candidate location 112 at respective time intervals $t_k$, $t_{k+1}$, $t_{k+2}$ and $t_{k+3}$ when the sensing device 102 is at a respective location along its trajectory, where the trajectory can include locations 102*a*-102*d*.

As shown at FIG. 1, the sensing device 102 receives radio signal 112*a* from the emitter at the candidate location 112 when the sensing device 102 is at a first location in its location 102*a* during the time interval $t_k$ and subsequently receives radio signal 112*b* from the emitter at the candidate location 112 when the sensing device 102 is at a second location in its location 102*b* during the time interval $t_{k+1}$. The sensing device 102 receives radio signal 112*c* from the emitter at the candidate location 112 when the sensing device 102 is at a third location in its location 102*c* during the time interval $t_{k+2}$, and subsequently receives radio signal 112*d* from the emitter at the candidate location 112 when the sensing device 102 is at a fourth location in its location 102*d* during the time interval $t_{k+3}$.

The sensing device 102 sends, over a communications link 134 established between the sensing device 102 and receiver station 120, the radio signals that are received at the sensing device 102 from various emitters, such as the radio signal 112*a* received from the emitter at the candidate location 112. Communication links can be established for exchanging data between the sensing device 102 and receive station 120 when the sensing device 102 is at a respective location along its movement trajectory.

For example, a communications link 134 is established between the sensing device 102 and the receiver station 120 at location 102*a* and for a corresponding time=$t_k$, while a communications link 136 is established between the sensing device 102 and the receiver station 120 at location 102*b* and for a corresponding time=$t_{k+1}$. Likewise, a communications link 138 is established between the sensing device 102 and the receiver station 120 at location 102_c_ and for a corresponding time=$t_{k+2}$, while a communications link 139 is established between the sensing device 102 and the receiver station 120 at location 102_d_ and for a corresponding time=$t_{k+3}$. In some implementations, the communications link 134, 136, 138, or 139 between sensing device 102 and receiver station 120 are direct radio or optical links.

Figure 9A:
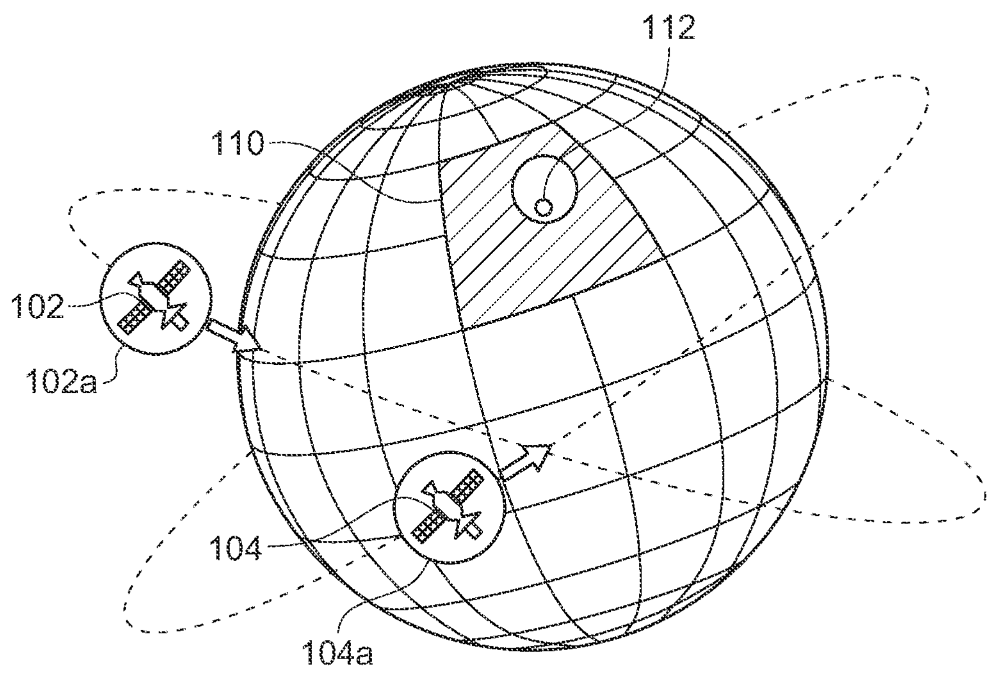
FIGS. 9A, 9B and 9C illustrate a conventional satellite system 100 arrangement of multiple satellites that may be used for implementing geolocation-aided unique signal recognition, according to an embodiment involving a comparison of signals detected by a plurality of sensing devices on respective satellites.
Figure 9B:
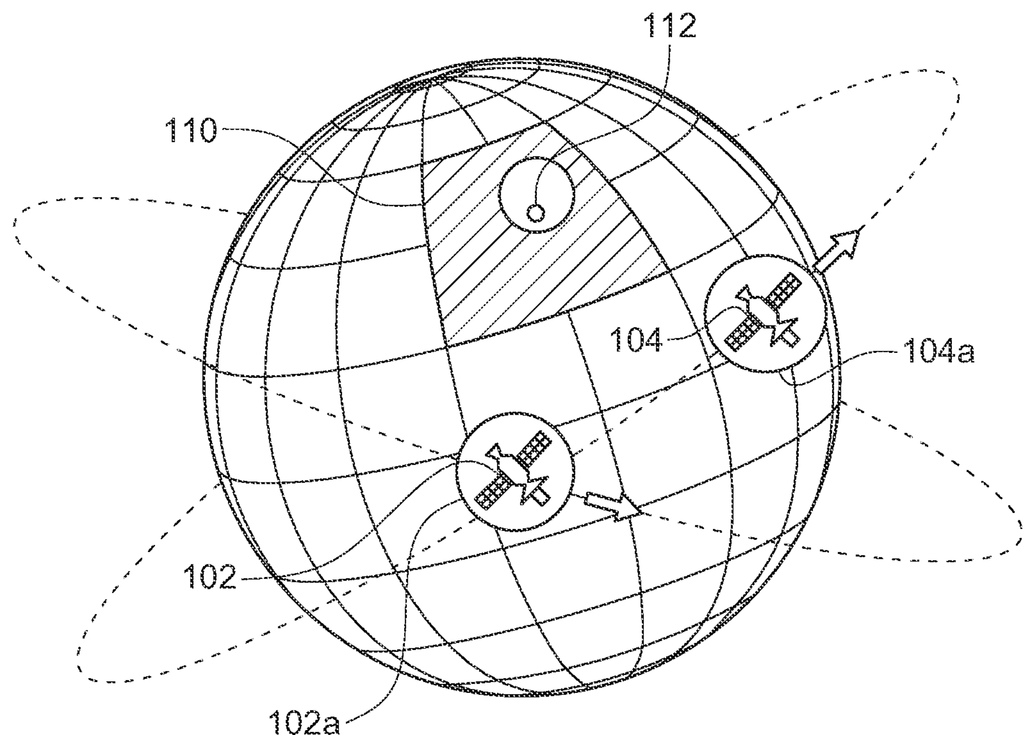
Figure 9C:
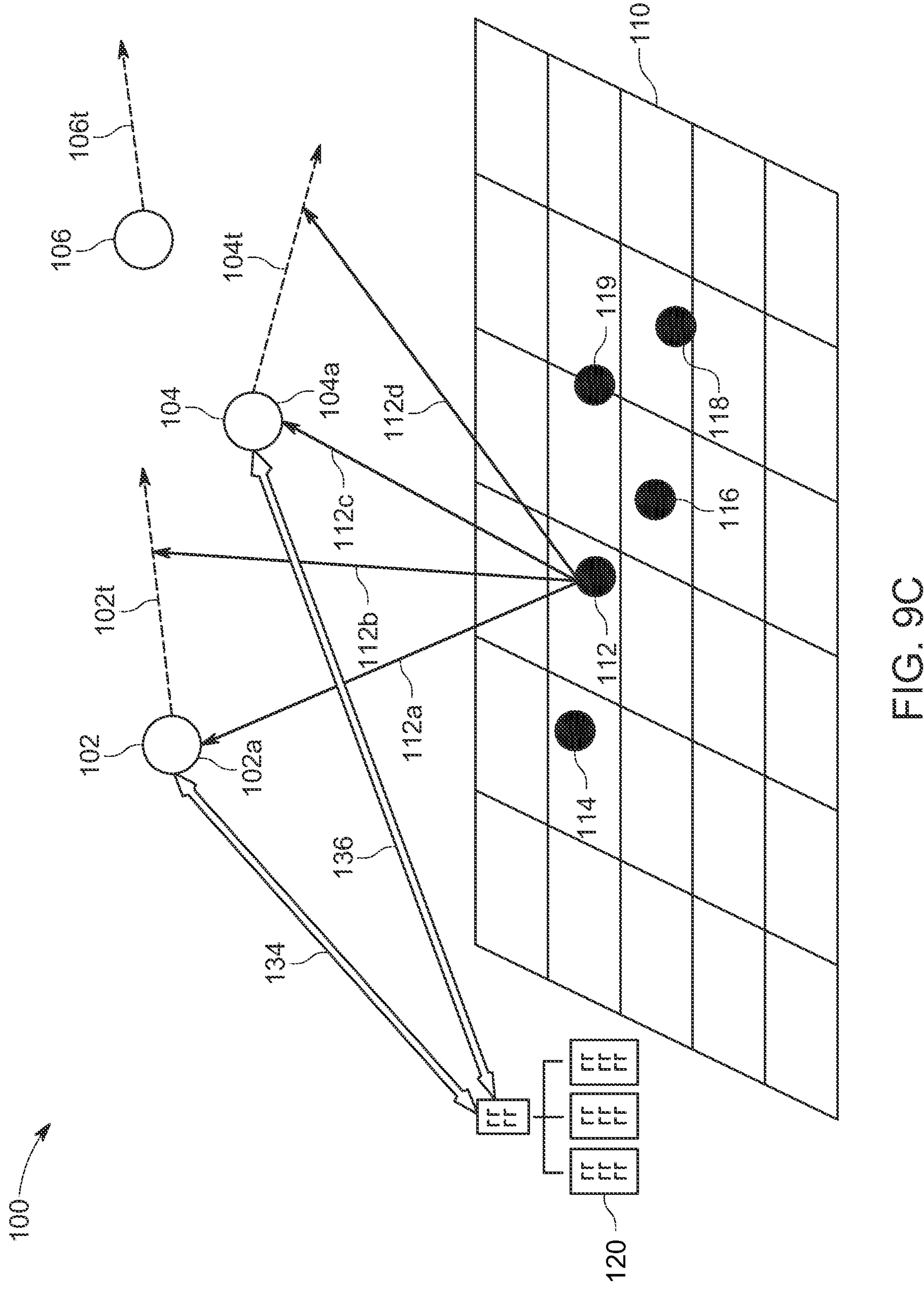

FIGS. 9A, 9B and 9C illustrate a conventional satellite system 100 of the type illustrated in FIG. 1 with multiple satellites that may be used for implementing geolocation-aided unique signal recognition, according to an embodiment involving a comparison of signals detected by a plurality of sensing devices.

According to an embodiment illustrated in FIGS. 9A and 9B, the system 100 may include sensing devices 102 and 104 on respective satellites in an orbit but separated apart. According to an embodiment, the respective satellites may be traveling in parallel orbits. However, the disclosure is not limited thereto. FIG. 9A illustrates that, at time $t_k$, the sensing device 102 is at location 102_a_ in transit to location 102_b_, and FIG. 9B illustrates that, at time tk+1, the sensing device 102 is at location 102_b_ in transit to its next location. Similarly, FIG. 9A illustrates that, at time tk, the sensing device 104 is at location 104_a_ in transit to location 104_b_, and FIG. 9B illustrates that, at time tk+1, the sensing device 104 is at location 104_b_ in transit to its next location. In an example, at a first time each sensing device may detect first RF signals based on RF energy emitted from a candidate location. At second time each sensing device may detect second RF signals based on RF energy emitted from the candidate location. The system analysis engine may iteratively process, according to the methods disclosed herein, the two signals detected by the different satellites 102 and 104 at the same time, or may process the signals separated in time at the same satellite 102 or 104, and determine from such pairs of signals a candidate emitter.

Figure 3:
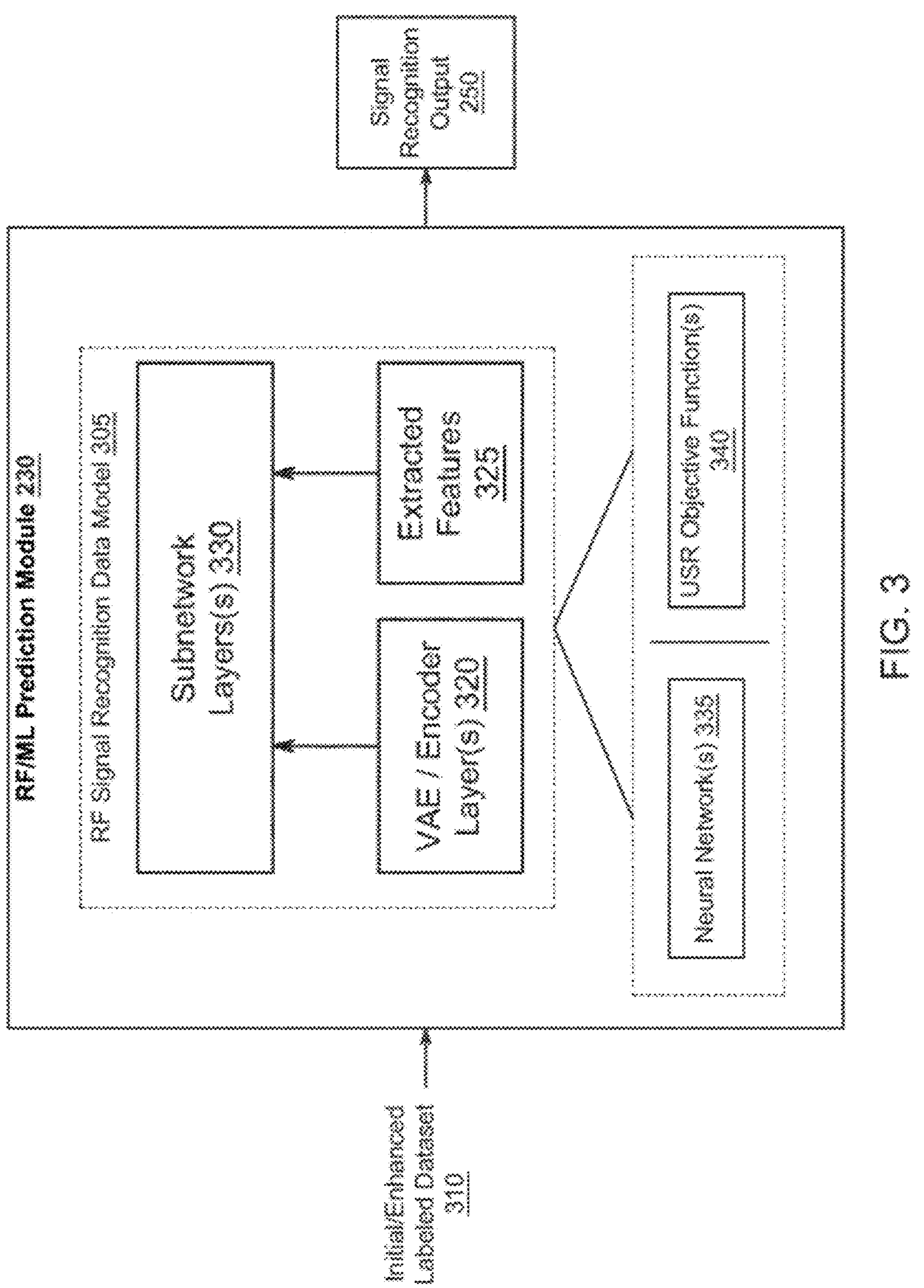
FIG. 3 illustrates an example RFML prediction module of the RF signal analysis engine at FIG. 2.

FIG. 9C illustrates an embodiment having three sensing devices. For example, FIG. 3 illustrates sensing devices 102, 104, and 106, which are mobile, with sensing device 102 moving with a trajectory 102_t_, sensing device 104 moving with a trajectory 104_t_, and sensing device 106 moving with a trajectory 106_t_. Depending on the type of the sensing device, the movement of the sensing devices 102, 104 and 106 are in space in some implementations, or on the terrestrial surface in some other implementations. In implementations where one or more of the sensing devices are aerial platforms, the sensing devices follow trajectories through space. For example, the sensing devices can include satellites that follow orbital trajectories with respect to the Earth's surface. According to an embodiment in FIG. 9C, the communications link 134 may established between the sensing device 102 and the receiver station 120 at location 102_a_ and for a corresponding time=$t_k$, while a communications link 136 may be established between the sensing device 104 and the receiver station 120 at location 104_a_ and for a corresponding time=$t_{k+1}$.

Figure 2:
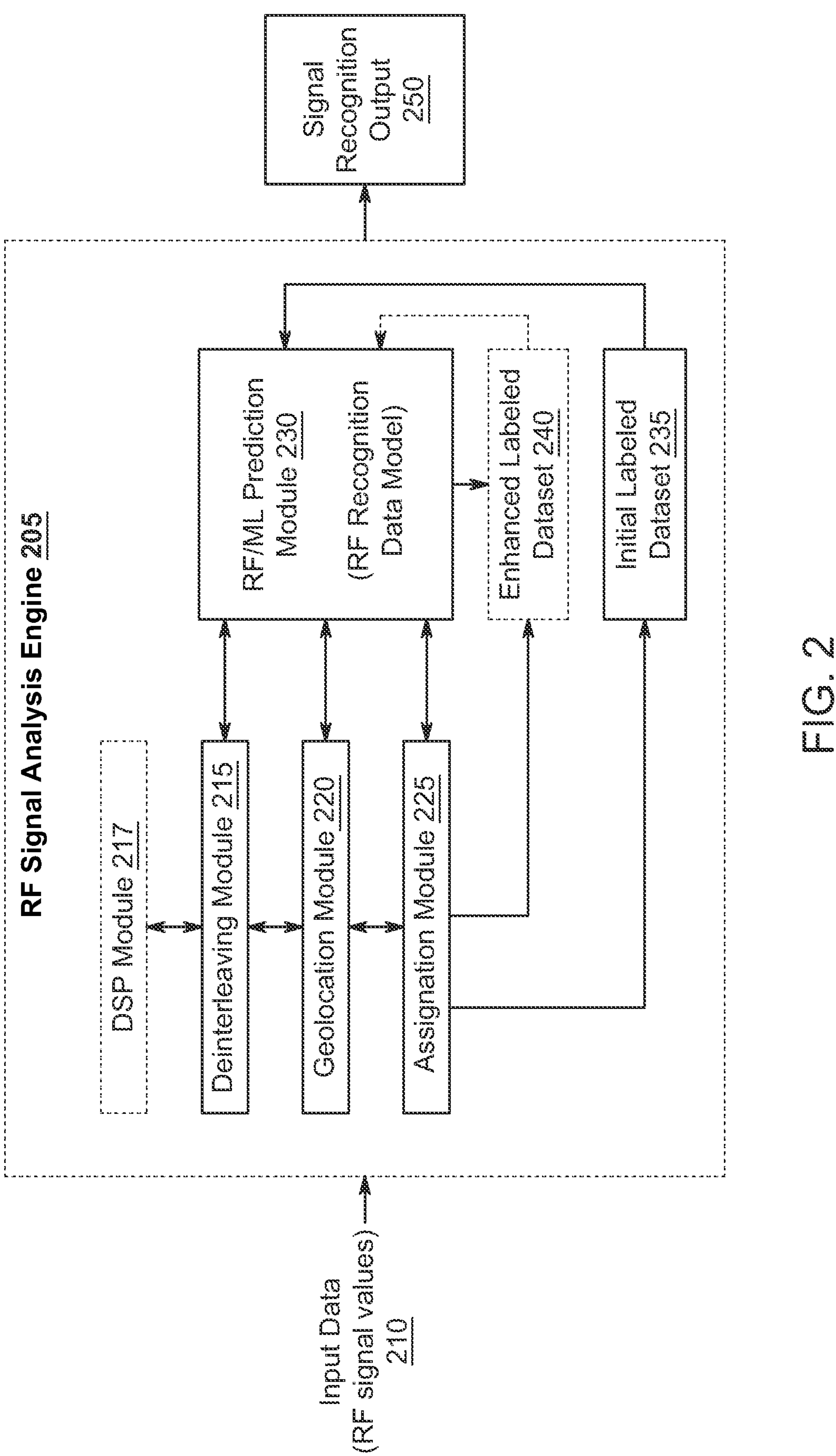
FIG. 2 illustrates an example RF signal analysis engine.

FIG. 2 illustrates an example RF signal analysis engine 205 that is configured to process a set of input data 210 to generate a signal recognition output 250. The RF signal analysis engine 205 generally includes a DSP module 212, a deinterleaving module 215, a geolocation module 220, and an assignation module 225.

Modules of the RF signal analysis engine 205 can be implemented in hardware, software, or both. In some implementations, the term "module" includes software applications/programs or a computer that executes one or more software programs (e.g., program code) that causes a processing unit(s) of the computer to execute one or more functions. The term "computer" is intended to include any data processing device, such as a desktop computer, a laptop computer, a mainframe computer, an electronic notebook device, a computing server, a smart handheld device, or other related device able to process data.

Deinterleaving

The deinterleaving module 215 cooperates with a DSP module 217 of the RF signal analysis engine 205 to perform one or more deinterleaving functions on received sets of RF energies, such as received bursts of detected RF signals. A standard process for deinterleaving RF bursts includes a set of digital signal processing (DSP) techniques being applied by the DSP module 217. The techniques are applicable to collections from singular (or multiple) receivers and are independent from geospatial considerations. Example DSP techniques that are applied by the DSP module 217 can include calculating center frequency, bandwidth, duration, or carrier-to-noise power density for a received RF energy. The DSP module 217 is operable to calculate a precise center frequency, such as a calculated center frequency that meets or exceeds a threshold measure of precision. The center frequency calculation is one of several features that the module is operable to calculate. For example, the DSP module 217 can also calculate properties related to groups of received RF energy such as intervals between identified periods of energy or similarity measures between elements within the group. The same emitter should produce RF energy resulting in consistent derived DSP calculations or derived DSP calculations following an identifiable trend. The DSP module 217 can implement mathematical clustering techniques, where the techniques may be based on these derived quantities and may form a basis for deinterleaving the RF energy.

In some implementations, given an unprocessed RF collection, a deinterleaving processing chain implemented using the deinterleaving module 215 and DSP module 217 will first identify pulses or bursts within a sub-process called segmentation. In an embodiment, the segmentation process may use information related to deinterleaving to improve results that may be obtained from a conventional segmentation process. The deinterleaving module 215 executes the processing chain to perform a mapping from individual bursts to some finite dimensional space (e.g., $\mathbb{R}^l$ for some natural number 1) within a feature-extraction subprocess. This mapping can be realized by combining or concatenating the output of a finite collection of feature extractors $e_i$: $B \rightarrow \mathbb{R}^{m_i}$ where B is the set of all bursts, $\Sigma_i m_i = l$ and m and i are an integer.

The deinterleaving module 215 is operable to perform one or more operations involving the set $\{e_i\}$. For example, the one or more operations can include taking such measurements as estimated bandwidth, center frequency, $C/N_0$, burst rise and fall times, and chirp rate, as well as performing operations related to harmonic analysis and performing curve-fitting operations. Operations relating to harmonic analysis can include decompositions in generalized Fourier spaces projected onto subspaces of finite dimension, whereas operations relating to performing curve-fitting can include use of polynomial fitting functions with finite degree. Based on these processes and operations, the deinterleaving module 215 is operable to: i) group bursts together in time-adjacent subsets of the total RF collection and ii) apply ensemble feature extractors $\hat{e}_i: \hat{B} \rightarrow \mathbb{R}^{m_i}$ where $\hat{B}$ is the set of grouped, time-adjacent pulses. A variety of ensemble feature extractors may be used, using a time-series analysis/features, for example.

For example, radar pulses from a single emitter may commonly appear at regular close time intervals so that examining peaks in the cyclic autocorrelation function applied to short-duration subsets of the RF collection, and comparing against time of arrival and measured $C/N_0$ for detected pulses in any subset, provides a means by which to establish pulse groupings. The cyclic autocorrelation function is related to, though not to be confused with, a cross-ambiguity function (CAF). In general, the autocorrelation function and the cyclic autocorrelation function are elements of signal processing and cyclostationary signal processing, respectively. Ambiguity and correlation both apply a quadratic functional to the data or signal of interest. Additionally, ambiguity and correlation both weight that quadratic functional by a complex exponential (sine wave) prior to integration or summation. The cyclic autocorrelation function is defined by an infinite-time average:

$$R_x(\tau, \alpha) = \lim_{T\to\infty} \frac{1}{T} \int_{-T/2}^{T/2} x(t+\tau/2)\, x*(t+\tau/2)\, e^{-i2\pi\alpha t} dt \quad (1)$$

As is well known for cyclic autocorrelation, x is a function of time, $\tau$ is the argument of the cyclic autocorrelation and represents the cyclic autocorrelation time lag, $\alpha$ is the cyclic frequency, and cyclic autocorrelation is the limit as the time window grows to infinity.

The RF signal analysis engine 205 can include one or more ensemble feature extractors. The ensemble feature extractors can include information relevant to the cyclic autocorrelation function (e.g., pulse repetition rate) and may also include statistical information relative to the outputs of single-burst feature extractors, $e_i$, taken across a set of grouped bursts $\hat{b}=\{b_1, \ldots, b_j\}$, $\hat{b}\in\hat{B}$. The outputs from the feature extractors and ensemble feature extractors may then be combined, such as by concatenating the results:

$$e: b \mapsto (e_1(b), \ldots, e_p(b), \hat{e}_{p+1}(\hat{b}), \ldots, \hat{e}_q(\hat{b}) \in \mathbb{R}^{m_1} \bigoplus, \cdots, \bigoplus \mathbb{R}^{m_q} \quad (2)$$

where, in equation/expression (2), $$b \in \hat{b} \text{ and } \sum_{i=1}^{q} m_i = n,\ n \geq l.$$

The system 100 can establish, assign, or otherwise denote e(b) as a pulse descriptor word (PDW) for burst b. Given two bursts b, b' in non-time-adjacent subsets of the RF collection, an example deinterleaving algorithm is:

$$D: \mathbb{R}^n \times \mathbb{R}^n \to \{0, 1\} \quad (3)$$

The preceding expression (3) compares feature vectors, such as PDWs e(b), e(b'), to render a binary decision as to whether they came from the same emitter. In one example implementation, D may comprise the Euclidean distance function followed by a thresholded decision such that distances lower than the threshold result in a positive decision and distances greater (or equal to) the threshold result in a negative decision.

In some implementations, for multiple RF signals that are detected across a set of emitters, the deinterleaving module 215 is operable to determine whether two or more RF bursts among the multiple RF signals should be grouped together, for example, as a cluster of signals. The RF signal analysis engine 205 can execute a deinterleaving operation to cluster the RF signals such that each cluster represents a possible grouping of RF signals by emitter.

The geolocation module 220 communicates with the deinterleaving module 215 to, for example, apply one or more geolocation processes to obtain reliable geolocation information for individual RF bursts. For example, geolocation module 220 is used to integrate certain geolocation information with operations of the deinterleaving module 215 such that, for each of the one or more receivers of system 100, the integrated geolocation information includes geospatial measurements comprising a respective time-varying position measurement and a respective velocity measurement for the receiver.

In some implementations, the RF signal analysis engine 205 uses the geolocation module 220 to determine mappings of the combined (or clustered) RF pulses to particular geolocations. For example, the clustering processes of the deinterleaving module 215 described above may generate clusters of RF pulses as a precursor operation to the geolocation mapping operation(s) performed by the geolocation module 220. The deinterleaving module 215 can pass outputs (e.g., deinterleaving outputs) of its clustering tasks to the geolocation module 220, which then provides those exemplary deinterleaving outputs as inputs to its one or more geolocation processes. As a result of correct deinterleaving, the geolocation processes can produce more precise geolocations since more total energy from each emitter is used as a foundation for calculating the resulting geolocations.

The assignation module 225 is configured to generate and apply one or more assignation labels based in part on results from the deinterleaving module 215, the geolocation module 220, or both. The assignation labels can indicate an assignment of RF signals to a corresponding emitter. In some implementations, the assignation model relies on information from outside of the RF signal analysis engine 225 to provide time and identity labels for emitter positions. An example of such outside information is the AIS dataset. For these implementations, temporal and spatial proximity between positions in the external data and geolocations produced by the geolocation module 220 allow for propagating the labels to the individual RF bursts. In some implementations, the RF signal analysis engine 225 creates an identifier for a cluster of bursts defined by the deinterleaving module 215 or for a geolocation produced by the geolocation module 220 and all of the bursts used to calculate that geolocation.

The RF signal analysis engine 205 further includes an RFML prediction module 230 that receives an initial labelled dataset 235 and generates an enhanced labelled dataset 240 based on the received initial labelled dataset. For example, the RFML prediction module 230 can include an untrained data model and, based on machine-learning processes, is configured to train the data model to apply a particular computational approach for implementing unique signal recognition. The RFML prediction module 230 is configured to iteratively generate sets of labeled training data ("iterative sets of labeled training data") that each include RF signal inputs derived from the grouping of RF signals and a respective label for each RF signal input. The RFML prediction module 230 is configured to generate an RF signal recognition data model based on machine-learning performed using the iterative sets of labeled training data.

The RF signal recognition data model obtains or receives an RF burst or a group of RF bursts as inputs, predicts an identity of an emitter associated with the RF burst or group of RF bursts, and applies an identifying label. In some instances, two or more RF bursts may share the same label if they were emitted from the same emitter. As such, for any cluster of RF bursts output by the deinterleaving module 215, the RF signal recognition data model can be used as an independent check on the quality of the clustering output. The output by the deinterleaving module 215 may be referred to as a deinterleaved cluster or an output cluster.

In an embodiment, the RFML prediction module 230 determines if a deinterleaved cluster includes an RF burst for which the RF signal recognition data model assigns an identifying label different from an identifying label assigned to other RF bursts in the output cluster, and the RFML prediction module 230 removes the RF burst from the cluster during an operation of the signal analysis engine 205.

In an embodiment, the RFML prediction module 230 determines if a deinterleaved cluster includes an RF burst for which the RF signal recognition data model assigns an identifying label identical to a label of the RF bursts in the output cluster, and the RFML prediction module 230 includes the RF burst in the output cluster during the operation of the signal analysis engine 205. Including such RF bursts with identical labels in the output cluster allows for generating an enhanced RFML cluster corresponding to the enhanced labelled dataset 240. These "RFML-enhanced clusters" can be used to produce more precise emitter geolocations leading to better assignments in the enhanced labelled dataset. Inclusion in or exclusion from clusters owing to RFML-enhanced clustering can be used to correct label assignment errors in the initial labeled dataset, leading to further enhancement of the initial labeled dataset. Enhanced labeled datasets can, in turn, be used by the RFML prediction module 230 to train (e.g., iteratively train) and generate increasingly accurate versions of the RF signal recognition data model.

The geolocation module 220 can aid the process of iteratively enhancing labeled datasets during a subsequent iteration by the inclusion of information from the RFML prediction module from a prior iteration. Inclusion or exclusion of an RF burst by the RFML prediction module 230 can be tested for consistency against resulting geolocations or geolocation-related measurements.

In an embodiment, the RF signal analysis engine 205 is configured to: i) generate a first labelled dataset that includes a respective label for each respective RF signal in an initial set of grouped or clustered RF signals (e.g., deinterleaving outputs) and ii) generate a second, different labelled dataset in response to machine-learning computations that are performed using the respective labels for each respective RF signal in the initial grouped or clustered set of RF signals.

This second, different labelled dataset corresponds to a first iteration of the enhanced labelled dataset 240 that is generated as an output of a feedback loop implemented at RF signal analysis engine 205. In some implementations, the RFML prediction module 230: i) generates multiple iterations of second, different labelled datasets, ii) uses the feedback loop to apply signal processing functions to each second, different labelled dataset, and iii) generates a corresponding enhanced labelled dataset 240 from a given second, different labelled dataset. For example, the RF signal analysis engine 205 feeds each iteration of a second labelled dataset 235 through some (or all) of the above described deinterleaving, geolocation, and assignation processes to generate a corresponding enhanced labelled dataset 240.

In some implementations, the RFML prediction module 230 receives or obtains data/control signals from each of the deinterleaving module 215, geolocation module 220, and the assignation module 225, and uses those data/control signals to generate different iterations of enhanced labelled dataset 240. As described herein, the RFML prediction module 230 can generate a trained (or optimized) RF signal recognition model based on machine-learning performed using the iterative sets of labeled training data.

For example, the RFML prediction module 230 (which may comprise one or more modules) can iteratively or repeatedly apply its machine-learning processes across the different iterations of enhanced labelled dataset 240 to generate an initial, or subsequently optimized, version of the trained RF signal recognition model. Hence, the RFML prediction module 230 is configured to optimize its computational approach (e.g., the approach applied by the trained RF signal recognition model) for performing unique signal recognition of emitter-based RF energies based on this iterative or repeated processing. The RF signal analysis engine 205 can then use the trained RF signal recognition model to process a set of input data 210 to generate a signal recognition output 250.

FIG. 3 illustrates an example RFML prediction module 230 of the RF signal analysis engine 205 described above with reference to FIG. 2. In the example of FIG. 3, the RFML prediction module 230 includes an RF signal recognition data model 305 that processes an input dataset 310 to generate a signal recognition output 250. The RFML prediction module 230 can be implemented using at least an arrangement of one or more encoder layers 320, feature layers 325, and subnetwork layers 330. In some implementations, the RF signal recognition data model 305 is a representation of the trained (or untrained) version of the data model described earlier with reference to the example of FIG. 2.

Each of the RF signal analysis engine 205, RFML prediction module 230, and RF signal recognition data model 305 may be accessed by, or included in, one or more computer systems of system 100, such as the receiver station 120 described earlier with reference to FIG. 1. For example, each of the RF signal analysis engine 205, RFML prediction module 230, and RF signal recognition data model 305 can be included in the receiver station 120 as a sub-system of hardware circuits, such as a special-purpose circuit, that includes one or more processor microchips. In some implementations, the special-purpose circuits are hardware accelerators or special-purpose neural network processors that can implement one or more neural networks 335 (described below).

Although a single RF signal analysis engine 205 and RFML prediction module 230 is shown in the examples of FIG. 2 and FIG. 3, respectively, in some cases receiver station 120 or system 100 can include multiple RF signal analysis engines 205 as well as multiple RFML prediction modules 230. In general, each of the RF signal analysis engine 205 and RFML prediction module 230 can include one or more of the special-purpose processors described above, as well as a central processing unit (CPU), a graphics-processing unit (GPU), memory, and data storage devices. Each of the RF signal analysis engine 205 and RFML prediction module 230 can also be included in a computer system 500, which is described later with reference to FIG. 5.

In some implementations, the neural networks 335 are machine-learning models that employ one or more layers of operations to generate an output, e.g., a classification, for a received input. Some neural networks 335 include one or more hidden layers in addition to an output layer. The output of each hidden layer is used as input to the next layer in the network, i.e., the next hidden layer or the output layer of the network. Some or all of the layers of the network generate an output from a received input in accordance with current values of a respective set of parameters.

Some neural networks 335 include one or more recurrent neural network layers. In general, recurrent neural networks (RNNs) are a class of neural networks that allow previous outputs to be used as inputs while having hidden states. For example, RNNs can be useful for modeling sequence data such as time-series or natural language datasets. Schematically, a recurrent neural network layer can use a for loop to iterate over the timesteps of a sequence, while maintaining an internal state that encodes information about the timesteps it has seen so far. Thus, RNNs can offer computational attributes that take into account historical information and include Long Short-Term Memory (LSTM) with one or more feedback connections.

In some implementations, the neural networks 335 are used by the RFML prediction module 230 to implement a class of modern ML approaches to time-series generation, prediction, translation, and data classification as RF recognition model 305. One class of approaches uses a general structure including a pre-processing step that incorporates RF domain knowledge, an autoencoder, such as variational autoencoder ("VAE"), (320) to extract features from the data, an optional mechanism to incorporate expert-derived feature extractors (325), and a family of decision-making subnetworks (330) that are arranged to connect a latent space of the autoencoder to the USR objective function. The autoencoder can incorporate a structural provision for exploiting time-series data. The autoencoder may be a VAE and/or use expertly derived features in combination with other techniques such as graph machine learning.

Figure 4:
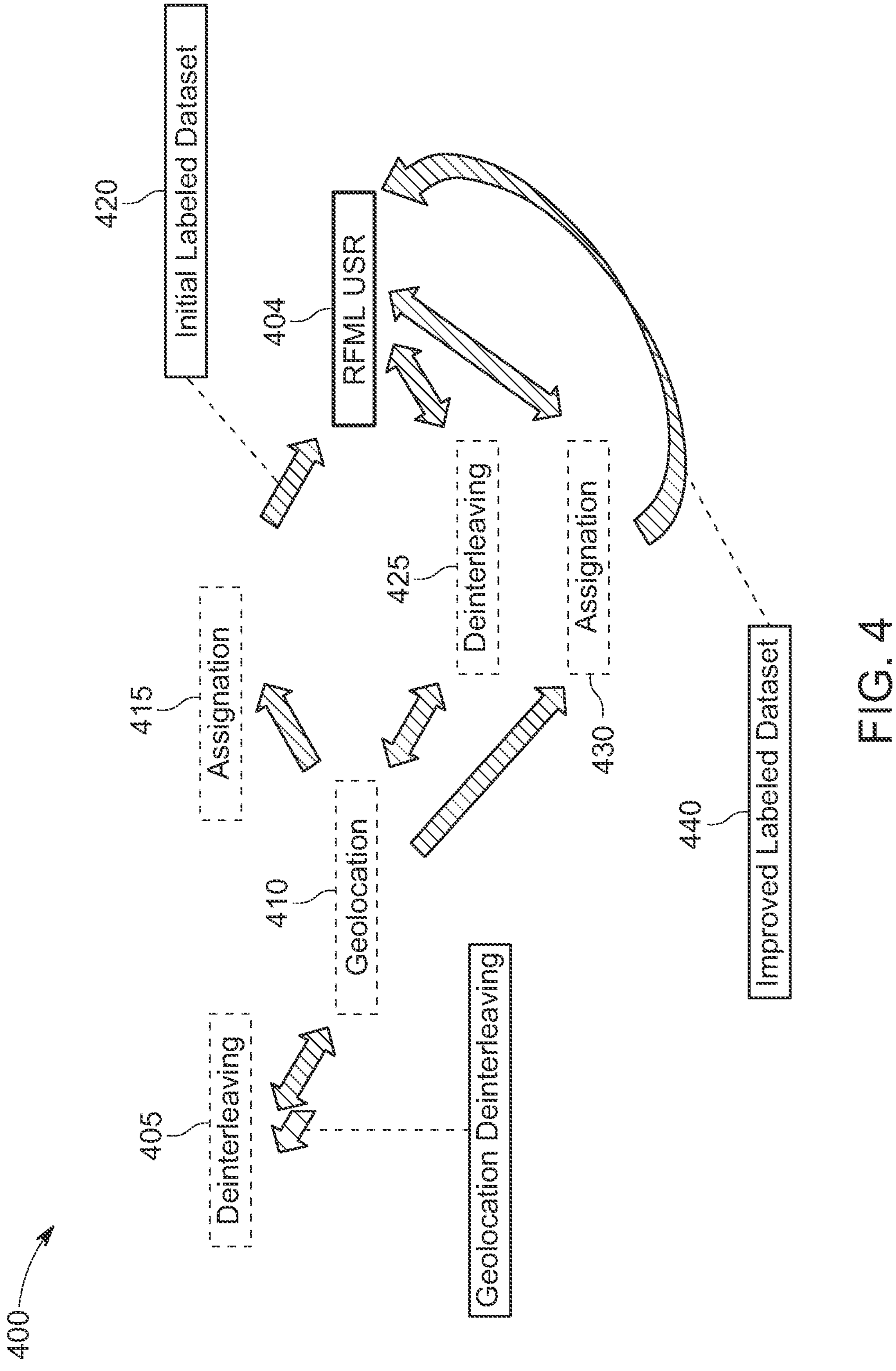
FIG. 4 illustrates an example process flow for implementing automatic RF signal identification using geolocation-aided unique signal recognition.

FIG. 4 illustrates an example flow diagram of a process 400 for implementing automatic RF signal identification using geolocation-aided unique signal recognition.

Process 400 can be implemented or executed using the computer systems of the receiver station 120 and the RF signal analysis engine 205 of system 100. Hence, descriptions of process 400 may reference the computing resources of at least the RF signal analysis engine 205 and RFML prediction module 230 described above. In some implementations, the steps or actions of process 400 are enabled by programmed firmware or software instructions, which are executable by one or more processors of the devices and resources described in this document.

Geolocation-Aided Deinterleaving

The process 400 includes a first RF signal-processing path that includes deinterleaving (405), geolocation (410), and assignation (415) operations that are performed to generate an initial labelled dataset 420. The process 400 further includes a second RF signal-processing path that includes deinterleaving (425), geolocation (410), and assignation (430) operations that are performed to generate an enhanced labelled dataset 440.

Geolocation-aided deinterleaving combines precise time-of-arrival and frequency-of-arrival information for received bursts and time-varying position and velocity measurements for multiple receivers to improve either the process by which time-adjacent bursts become grouped into elements of the set $\hat{B}$ or to improve the functionality of the binary classifier D by extending the input of the classifier to include geospatially-relevant information. In some cases, for any candidate grouping $\hat{b} \in \hat{B}$ and any time-adjacent burst b', the RF signal analysis engine 205 can use information from multiple receivers to determine the geospatial likelihood of inclusion $b' \in \hat{b}$.

In some implementations, an example cross-ambiguity function (CAF) is denoted by $CAF_{\hat{b}}(R_1, R_2)$ for any two receivers $R_1$, $R_2$ in the collection system $\hat{b}$. This denoted CAF can be taken over the union of bursts in $\hat{b}$ from $R_1$ against the same time-adjacent subcollection from $R_2$. Since b' is time-adjacent to any burst $b \in \hat{b}$, the system 100 is operable to expect $TDOA(R_1, R_2)(b) \approx TDOA(R_1, R_2)(b')$ for any two receivers $R_1$, $R_2$ in the collection system. The same can hold for FDOA. Hence, adjusting for noise correlation, the RF signal analysis engine 205 can be configured to generate determinations corresponding to the following expressions.

$$b \in \hat{b} \Rightarrow CAF_{b' \cup \hat{b}}(R_1, R_2) > CAF_{\hat{b}}(R_1, R_2) \tag{4}$$

and $$b \notin \hat{b} \Rightarrow CAF_{b' \cup \hat{b}}(R_1, R_2) < CAF_{\hat{b}}(R_1, R_2). \tag{5}$$

This basic inequality allows us to apply geospatial information as input to the time-adjacent burst grouping process.

Expressions (4) and (5) relate to hypothesis testing. For example, a hypothesis may be that b is in grouping $\hat{b}$ (e.g., correspondence to the same emitter). From this hypothesis, the RF signal analysis engine 205 can then determine that the CAF applied to the union of b and $\hat{b}$ is higher than if b is not in the grouping $\hat{b}$. Alternatively, if b does not belong to b, the RF signal analysis engine 205 may determine that the CAF applied to the union is lower relative to the higher CAF. In some implementations, the RF signal analysis engine 205 is used to apply the CAF to both $\hat{b}$ and the union of b with $\hat{b}$, compare the respective results for applying the CAF in both instances, and establish which hypothesis is most likely (given just this set of information). As the result or value of the CAF increases, the system is likely to experience a corresponding increase in precision of the geolocation resulting from the use of the indicated TDOA and FDOA measurements. Hence, expressions (4) and (5) show that, by changing the constitution of the groupings, the geolocation result quality can change as well.

In general, time difference of arrival (TDOA) is a technique applied or used by system 100 for geo-locating RF sources. In some implementations, the technique requires one or more receivers (or probes) capable of detecting signals of interest. Each probe can be synchronized in time to capture corresponding real (I) or imaginary (Q) (I/Q) data blocks. The system 100 is configured to shift a respective time signature of each I/Q dataset to determine a difference between the respective arrival time at each probe. Based on this computation, the system 100 can obtain the difference in a distance of the source from each set of probes and derive solutions to relevant distance equations to obtain the geolocation of the actual RF source. The system 100 is operable to combine TDOA and frequency difference of arrival (FDOA) measurement techniques to perform instantaneous geolocation in one or more dimensions.

In some implementations, the RF signal analysis engine 205 can be configured such that, if two bursts b, b' arise from non-time-adjacent subcollections, then the RF signal analysis engine 205 can still leverage geospatially relevant information to enhance or improve upon its implementation of the binary classifier D prior to attempting the geolocation process. Assuming multiple receivers, the RF signal analysis engine 205 can derive a set of measurements from each burst (e.g., after deriving burst groups $\hat{b}$, $\hat{b}'$).

$$TODA(R_i, R_j)(\hat{b}), FDOA(R_i, R_j)(\hat{b}), \tag{6}$$

$$TODA(R_k, R_l)(\hat{b}'), FDOA(R_k, R_l)(\hat{b}') \tag{7}$$

In some implementations, because the same two receivers need not be used to derive measurements for each burst, the RF signal analysis engine 205 can be configured to use arbitrary receiver indices i≠j, k≠l. The RF signal analysis engine 205 can also determine a covariance estimate for each measurement, taking into account $C/N_0$ for each burst. The RF signal analysis engine 205 can use these operations to determine a set of weightings to weight the importance of each measurement individually. The RF signal analysis engine 205 is configured to apply estimates for receiver position and velocity at times of arrival $TOA(R_{i,j})(\hat{b})$ and $TOA(R_{k,l})(\hat{b})'$, respectively.

From this, the RF signal analysis engine 205 can derive $\{S_q(x,y,z)\}$, $q \in 1, \ldots 4$, which represent a system of four nonlinear equations in three variables constraining the position of the emitter. The RF signal analysis engine 205 can then solve for the position of the emitter in three-space. Some solutions can be based on an assumption that the position is identical at the times in question. The RF signal analysis engine 205 can then minimize the system over all possible emitter positions using an appropriate norm N: $\mathbb{R}^4 \rightarrow \mathbb{R}$ to derive a corresponding prediction g.

Using the $L^2$-norm, the RF signal analysis engine 205 is operable to determine a least-squares estimate minimizing $$\sum_{q=1}^{4} (S_q(x, y, z))^2.$$

While accounting for covariance on the original measurements, the RF signal analysis engine 205 can employ weighted least squares to minimize the system of equations. Working back through receiver position and velocity estimates, the RF signal analysis engine 205 can calculate residuals for each of the original estimates based on prediction g. Comparing these residuals to the covariance estimates, the RF signal analysis engine 205 can determine the probability of deducing prediction g given the assumption b and b' come from the same emitter location. The complement corresponds to the probability b and b' come from different locations.

For the non-time-adjacent case, a single receiver may prove sufficient to implement geolocation-aided deinterleaving (though the problem becomes more complex and less practical with only one receiver). For any collection, system 100 can employ an over-determined system of equations to constrain an emitter position, use that information to generate prediction g, and then evaluate an assumption (e.g., that the position of the emitter is fixed across all observations $\hat{b}$ in $\hat{B}$) against the measurement covariance statistics relying on that assumption. For instance, if it is assumed that an emitter uses the same center frequency throughout a collection, then for any four bursts $b_1$, $b_2$, $b_3$, $b_4$, the RF signal analysis engine 205 can derive three independent measurements:

$$\{FDOA(b_1, b_i) | 2 \le i \le 4\}, \tag{8}$$

and, using estimates for receiver position and velocity at times $TOA(\hat{b}_i)$ for $1 \le i \le 4$, determine a system of three equations constraining the position of the emitter under the prevailing assumption. Further constraining the emitter position by assuming it lies on the surface of the Earth, the RF signal analysis engine 205 can obtain an over-determined system of equations, and then can proceed as above.

RF Machine-Learning (RFML)—Unique Signal Recognition

The process 400 includes an iterative execution of various processes and operations for application of RFML unique signal recognition (404). The processes and operations are executed or applied using the RFML prediction module 230 described earlier with reference to the example of FIG. 2. In general, through a network of processes involving deinterleaving (405, 425), geolocation (410), and assignation (415, 430) operations, the system 100 is operable to generate initial and enhanced versions of labeled input datasets. In some cases, the initial labeled dataset is an initial portion of training data to be processed using at least one neural network 335 of the RFML prediction module 230.

For example, the labeled dataset 420 is received and processed at the RFML prediction module 230 based at least on the following machine-learning framework (404):

$$\mathcal{B} = \{(b, id(b)) | b \in A(G(B))\}, \tag{9}$$

where, B is the set of segmented bursts, G(P)⊂P is the subset contributing to a geolocation, A(G(P))⊂G(P) is the subset for which the associated geolocation resolves to an emitter identity label via the assignation process, and id(b) is the associated identity label.

Each burst is a finite time series of complex-valued samples representing in-phase and quadrature components. Note that id(b) is a "noisy label" in the sense that each process in the GA-USR network is prone to error, and error at any point in the network may contribute to faulty assignation. This labeled dataset makes the USR problem tractable using a general class of modern ML approaches to time-series generation, prediction, translation, and classification. As indicated above with reference to the example of FIG. 3, each approach in the class uses a general structure including a pre-processing step that incorporates: i) RF domain knowledge, ii) an autoencoder, which may be a VAE, to extract features from the data, iii) an optional, example mechanism to incorporate expert-derived feature extractors, and iv) a family of decision-making subnetworks that are arranged to connect the output of ii) and iii) (e.g., encoder layers 320, feature layers 325) to the USR objective function 340. The autoencoder can incorporate a structural provision for exploiting time-series data.

An example of the class will now be described in fuller detail, beginning with a discussion of preprocessing in a GA-USR data processing pipeline. RF preprocessing normalizes the input set B to remove distinguishing properties of the input data time series that known, e.g., from the standpoint of RF processing expertise, not to contribute to the USR objective function. For instance, if the receivers are in low-Earth-orbit and the emitters are maritime vessels, then the RF signal analysis engine 205 can be configured to normalize peak or median time series amplitude across all labeled input series.

Similarly, the RF signal analysis engine 205 is operable to tune input series center frequencies such that the FFT bin with maximum amplitude is the same bin across all input samples for some uniformly chosen number of FFT bins. In either case, relative, time-varying positions and velocities between the receivers and emitters (none of which informs the decontextualized identity of the emitters) can impact the normalized qualities of the input series. In some implementations, the RF signal analysis engine 205 applies normalization in the preprocessing stage to minimize the effects of these confounding properties in the data, thereby streamlining (or simplifying) the processing workload at the follow-on stages of a GA-USR data processing pipeline.

In an exemplary embodiment, a VAE is an example ML-building block capable of performing dimensionality reduction on input series in such a way that reconstruction of the original series is part of the objective function. The VAE may be comprised of separate encoding and decoding subcomponents, and can also incorporate a regularization term (KL-divergence minimization) into the objective function 340 to prevent overfitting. The encoder maps input to latent space, that is, it projects data into a latent space of random variables. The regularization term enables training by variational approximation of the posterior probabilities in the latent space.

The reconstructive and regularizing components combined with the dimension-reducing properties of the encoder layer combine in such a way that the encoder layer essentially learns to extract features from input data and sampled data from the latent space of the VAE is suitable input for the follow-on network layer defining the USR objective function 340. To utilize a standard VAE, the RFML prediction module 230 may simply ignore the time series structure of the input data, treating labeled input as one-dimensional vectors, such that the standard VAE may enable the larger RFML USR. The RF signal analysis engine 205 is operable to project each input burst b through the encoder of a particular selected standard VAE to arrive at the projection E(b).

Going a step further, the RF signal analysis engine 205 processes time series data that lends itself to a specialized family of autoencoders, which may be VAEs incorporating sequential learning structures (e.g., for time series), such as attention or RNNs within the encoder/decoder pair. For instance, the system 100 can incorporate an autoencoder structure that combines attention with variational training components for human language processing.

The techniques disclosed in this specification can also addresses a "bypassing" phenomenon common to many hybrid sequential and variational models. By addressing this phenomenon, the system 100 allows the decoder to not only learn generative behavior to reconstruct inputs from the output of the encoder layer, but also that the output of the encoder layer in the latent space represents meaningful information for input sequence reconstruction and for other follow-on processes. The system 100 can optionally incorporate a similar hybrid ML network that uses LSTM for time series data from sensors. The system 100 may also combine an example Transformer network with variational training for feature extraction.

In some implementations, the RFML prediction module 230 uses these deep learning network structures and other comparable networks, alone or in combination, substituting input time series for the exemplar input data. The RFML prediction module 230 can progress using the output of the encoder layer as a feature space, and can also, under some circumstances, combine these features with expertly-derived features, such as those used for deinterleaving. For example, to do this, a new feature space is composed by taking the direct product of the learned and expertly-derived feature spaces. To reduce complexity at the follow-on network layer defining the USR objective function 340 or to encourage improvements in learned features through the autoencoder, the RFML prediction module 230 is operable to learn a lower-dimensional composition of the two spaces in the following way.

RFML prediction module 230 can be configured to incorporate both expertly-derived and learned features. For example, the RF recognition model can provide a computational benefit of approximating expertly-derived features in response to training the network to approximate expertly derived features (e.g., by using the expertly derived features themselves). In this manner, a network of the RF recognition model 305 can be tuned to more efficiently learn information that an expert might not have considered.

Overall performance of a model network, a larger network of the model or an ensemble of models using expertly derived and learned features can also outperform networks that are trained using expert features alone. In general, by training a network using various sets of learned features (e.g., expert and non-expert features), the RFML prediction module 230 can uncover relationships and connections in a set of data that maybe unintuitive or otherwise not exposed through expert feature extraction alone. In some cases, experts often know features in the data that are important relative to the objective function, but it may be challenging for certain data models to learn these features to a level equivalent to that of an expert.

Thus, a technique for optimizing performance of the RFML prediction module 230 can include using a set of known expertly-derived features to seed the network. The training process for the network can then be focused on the orthogonal complement of information in the set. Based on this training process, the RFML prediction module 230 can generate an RF recognition model with a baseline performance that can match (or substantially match) the expertly derived features. This model can also have the capability to learn relevant features that may go undetected by an expert. In some implementations, the training process yields a model that is uniquely optimized to determine just this type of otherwise undetectable information.

n can be used to denote the dimension of the expertly-derived feature vectors. The RFML prediction module 230 can estimate the dimensionality of the feature space: $n' \leq n$. The system 100 can then choose n' and the dimensionality m of the VAE latent space such that $n' < m$ and m is small enough to affect meaningful reduction from the dimensionality of the input space to the dimensionality of the VAE latent space to preserve the dimensionality reduction of the VAE encoder layer. The example network 335 of the RFML prediction module 230 can incorporate a fully connected layer $FC_e$ of size n,n' that takes, as input, expertly-derived feature vectors and another fully-connected layer $FC_l$ of size m,n' taking as input the m-dimensional latent space vectors.

By tuning the objective function 340 to minimize divergence between $FC_e$ and $FC_l$, such as by adding a mean squared error term, the VAE can be incentivized to learn an approximation to the expertly-derived features (the support of $FC_l$), and can interpret the kernel of $FC_l$ to be the contribution of the latent feature space orthogonal to the expertly-derived features.

Approximating the expertly-derived features is useful if, for instance, the process to compute those features is computationally costly. Isolating the kernel allows us to use the projection of a latent feature vector into the kernel as a new feature for deinterleaving. By priming the network to learn an approximation to the expertly derived features, the network may more quickly converge. By prompting the network to converge to local minima where a subspace of the latent feature space approximates the expertly-derived feature space well (e.g., above an approximation threshold), the training can more effectively focus on optimizing latent features that may not have been considered as relevant to the source of the expertly-derived features.

The RFML prediction module 230 can use the potential of the autoencoder, for example VAE, latent space to contribute to the ultimate goal of USR by connecting the network to one or a family of decision-making subnetworks. In some implementations, a family of convolutional neural network (CNN) classifiers (e.g., AlexNet instances) fed from the autoencoder, for example VAE, latent space can accomplish the USR task. Each CNN classifier is trained on labeled input (E(b), id(b)) for $(b, id(b)) \in \mathcal{B}$. In some cases, back-propagation through the autoencoder is optional and may benefit autoencoder, for example VAE, training with respect to the USR objective function 340. The number of output states may be as few as two, in which case the classifier discriminates between bursts from a single emitter and burst from all other emitters. In this instance, a separate decision-making layer may be required for each distinct emitter that a user wishes to track. The system 100 may combine multiple targeted emitters within a single decision-making subnetwork 330 by expanding the number of classification bins within the subnetwork.

Each emitter that is being tracked, up to the entire set $\{id(b)\ (b, id(b)) \in \mathcal{B}\}$, can be represented by a bin in at least one of the decision-making subnetworks 330. In some implementations, each subnetwork 330 in the family is trained independently of the others. Rather than making a hard decision within each network, the RFML prediction module 230 can be configured to preserve a probabilistic output of a softmax layer at a terminus of each decision-making network. In some implementations, to realize the full USR application, the RFML prediction module 230 combines the output of the decision-making network family when running inference through the combined trained model.

The RFML prediction module 230 can perform this function by, for example, selecting the bin with the highest total probability. Alternatively, the RFML prediction module 230 can include a classifier of classifiers (e.g., implemented as another CNN classifier) that takes, as input, the "soft" probabilistic values of the decision-making subnetwork family and that is trained to make a final decision using the labeled data.

Figure 5:
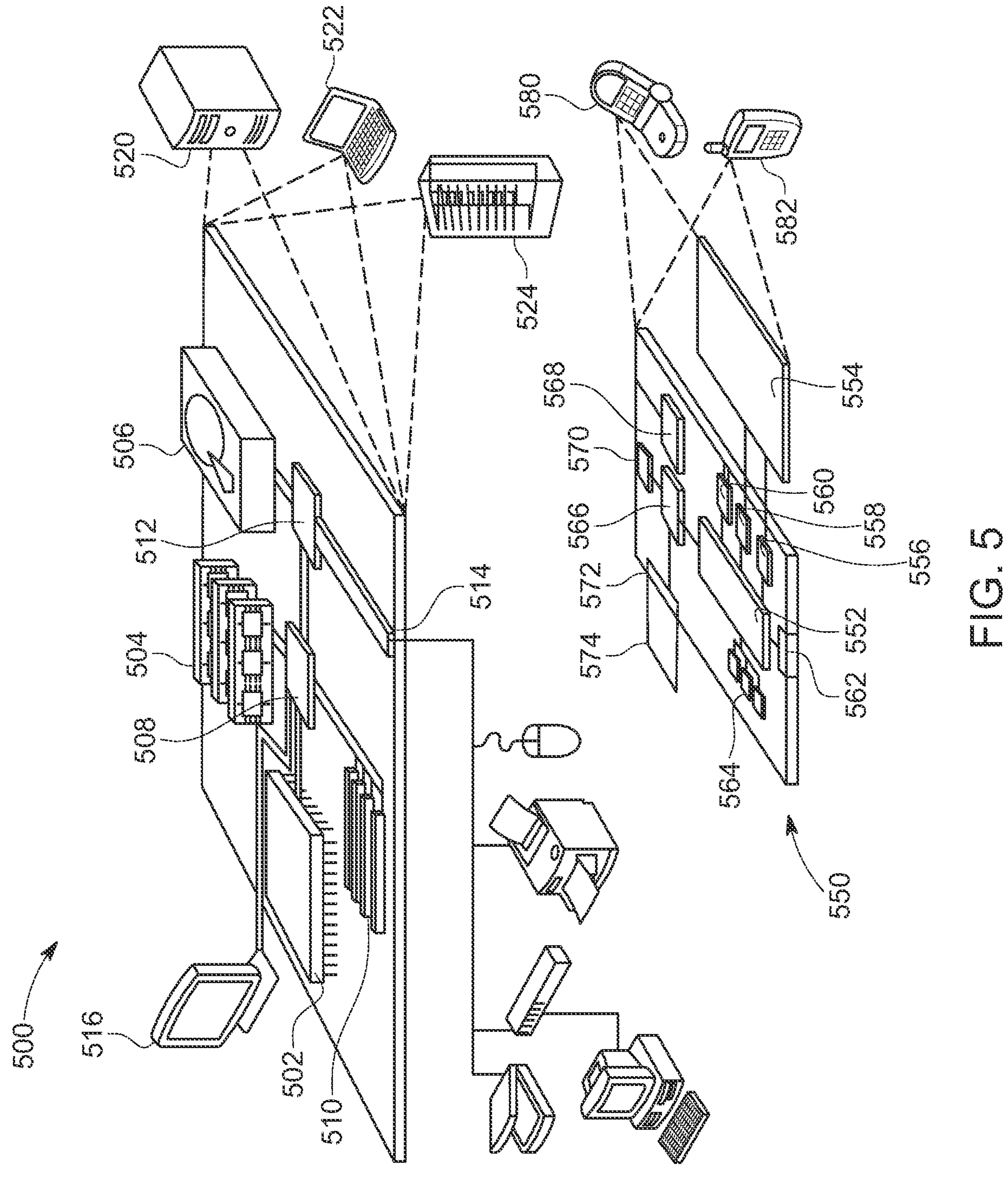
FIG. 5 is a block diagram of a computing system that can be used in connection with methods described in this specification.

FIG. 5 is a block diagram of computing system/devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Multiple computing devices 500 also may be connected, with each device providing portions of the disclosed operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product includes instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may include one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product includes instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry in some cases. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Figure 6:
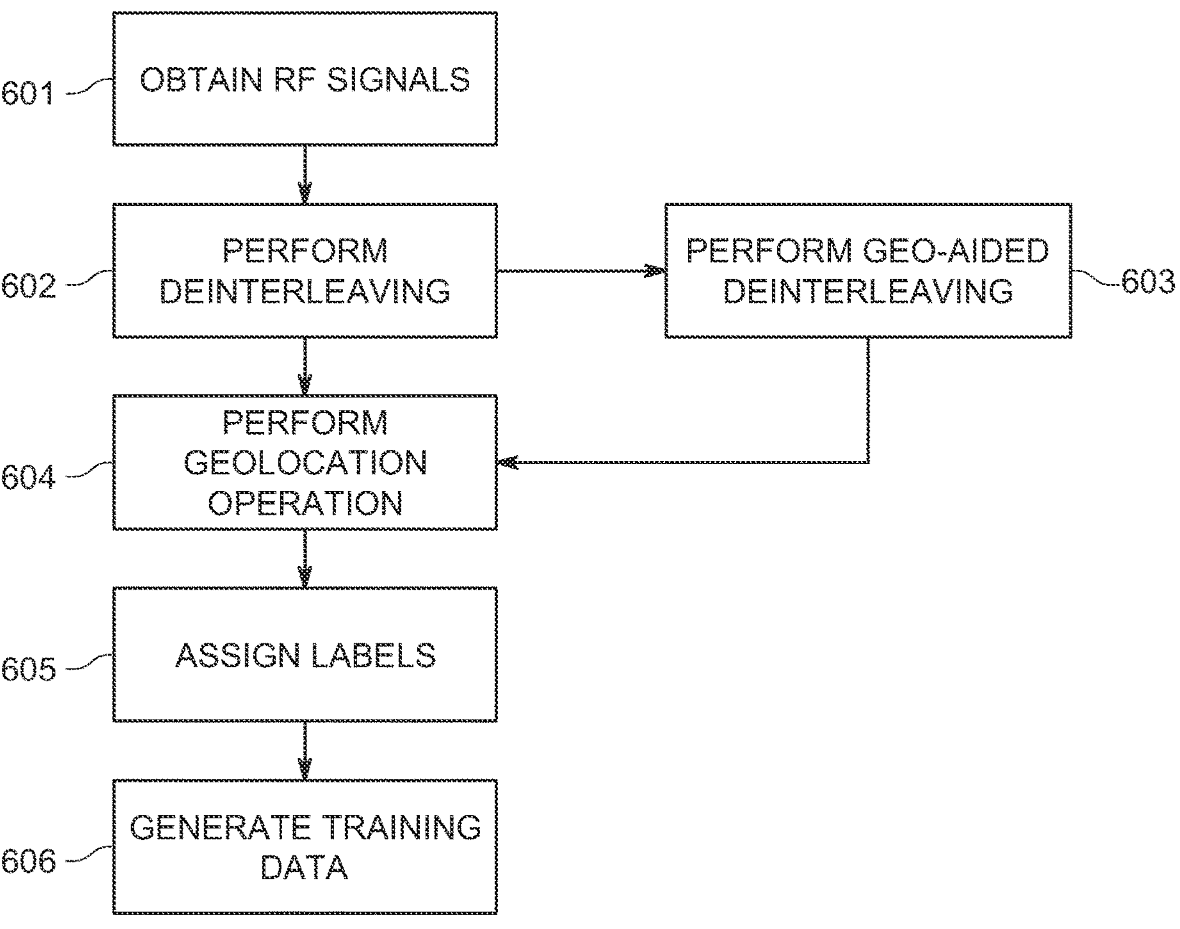
FIG. 6 is a flowchart illustrating a method of generating a labeled training dataset for training a machine-learning radio frequency signal recognition model, according to an embodiment.

FIG. 6 is a flowchart illustrating a method of generating a labeled training dataset for training a machine-learning radio frequency signal recognition model, according to an embodiment.

Referring to FIG. 6, at 601, the method 600 may include obtaining RF signals. For example, the sensing device 102 in FIG. 1 may detect RF energy from various emitters in the area 110. The sensing device 102 may obtain the set of RF signals via an RF sensor onboard the sensing device 102 configured to detect and receive the RF signals. In step 601, the signal analysis engine 205 may then obtain the set of RF signals from the RF sensor. As another example, the signal analysis engine 205 may obtain one or more previously received and processed RF signals. For example, the previously processed RF signals may have been processed by the signal analysis engine 205 in a previous iteration. However, the disclosure is not limited thereto, and as such, the previously processed RF signals may have been processed by a different device. As yet another example, the signal analysis engine 205 may obtain a combination of RF signals from the RF sensor and previously processed RF signals.

According to an embodiment, the process in step 601 may include determining whether the obtained set of RF signals is an initial training data set or an enhanced training data set. For example, the signal analysis engine 205 may determine whether the obtained set of RF signals correspond to an initial training dataset for training a RF recognition model 305. For example, based on a determination that the obtained RF signals are untrained, the signal analysis engine 205 may determine that the obtained set of RF signals is an initial training dataset. On the other hand, based on a determination that the obtained RF signals is a trained model, the signal analysis engine 205 may determine that the obtained set of RF signals is not an initial training dataset.

According to an embodiment, the method 600 proceeds to 602. If the signal analysis engine 205 determines that the obtained set of RF signals corresponds to an initial training dataset, and the method 600 proceeds to step 604. If the signal analysis engine 205 determines that the obtained set of RF signals do not correspond to an initial training dataset (e.g., enhanced training dataset), the method may proceed to step 603, where geo-aiding is performed on the deinterleaved output of step 602. Geo-aided deinterleaving is an optional refinement to deinterleaving as it requires output from deinterleaving and improves the results of the process. However, the whole system works with our without geo-aided deinterleaving. Thus, the disclosed method is not limited thereto, and as such, according to another embodiment, the determination of whether the obtained set of RF signals is trained or untrained may be omitted.

Typically, at 602, the method 600 may include performing deinterleaving on the initial training dataset. For example, with reference to FIG. 2, the signal analysis engine 205 may input the obtained set of RF signals to the deinterleaving module 215. The deinterleaving module 215 may perform one or more deinterleaving operations on the set of RF signals to cluster the RF signals such that each cluster represents a candidate grouping of RF signals by emitter. For example, the deinterleaving module 215 may implement a deinterleaving process using the DSP module 217 to perform various DSP operations on the set of RF signals, independent from geospatial considerations, to group RF signals by emitter, and identify RF bursts based on the RF signals.

Typically, at 603, the method 600 may include performing geolocation-aided deinterleaving on the enhanced training dataset. For example, the deinterleaving module 215 may coordinate with the geolocation module 220 to perform geolocation-aided deinterleaving on the enhanced training dataset.

At 604 the method 600 may include performing a geolocation operation to estimate candidate locations for each of a plurality of RF bursts identified by the deinterleaving operation. For example, with reference to FIG. 2, the geolocation module 220 may obtain an output of the deinterleaving module 215, and perform a geolocation operation on then RF signals based on the output of the deinterleaving module 215. Here, the method may include performing a geolocation operation to estimate candidate locations for each of a plurality of RF bursts identified by the deinterleaving operation in either operation 603 or operation 604.

At 605, the method 600 may include assigning labels to the enhanced training dataset. For example, with reference to FIG. 2, the assignation module 225 may assign labels based on an output of the geolocation module 220.

At 606, the method 600 may include generating training data. For example, with reference to FIG. 2, the RFML prediction module 230 may generate training data based on the output of the assignation module 225.

Figure 7:
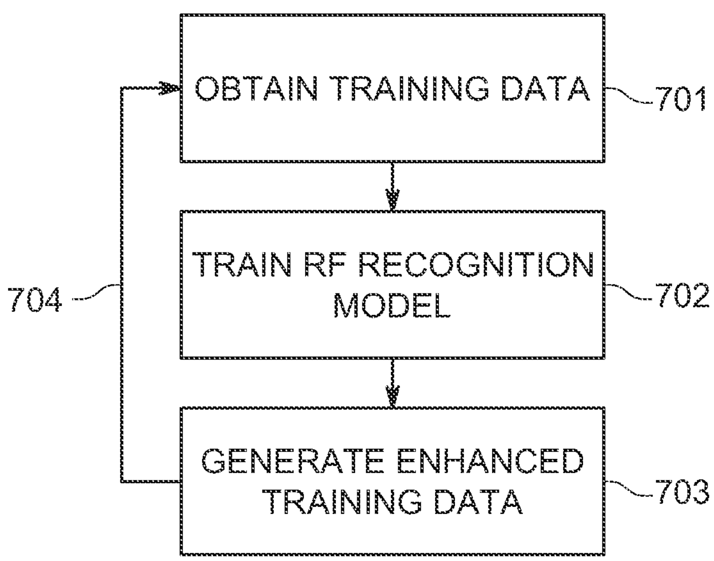
FIG. 7 is a flowchart illustrating a method of generating an enhanced labeled training dataset, according to an embodiment.

FIG. 7 is a flowchart illustrating a method 700 of generating an enhanced labeled training dataset, according to an embodiment.

Referring to FIG. 7, at 701, the method 700 may include obtaining training data. For example, with reference to FIG. 2, the RFML prediction module 230 may obtain an output of the assignation module 225 as the training data. For example, the RFML prediction module 230 may receive an initial labelled dataset 235 from the sequence of steps 602, 604, 605 and 606 in FIG. 6.

At 702, the method 700 may include training a RF signal recognition data model based on the received initial labelled dataset. For example, with reference to FIG. 2, the RFML prediction module 230 may iteratively train the RF signal recognition data model based on the obtained training data from the assignation module.

At 703, the method 700 may include generating enhanced training data. For example, with reference to FIG. 2, the RFML prediction module 230 may use the generated RF signal recognition data model to generate enhanced training data.

At 704, the method 700 may include using the enhanced training data in a next iteration. For example, with reference to FIG. 2, the RF signal analysis engine 205 may provide the enhanced training data in a next iteration to train a RF signal recognition data model based on the enhanced training data.

Figure 8:
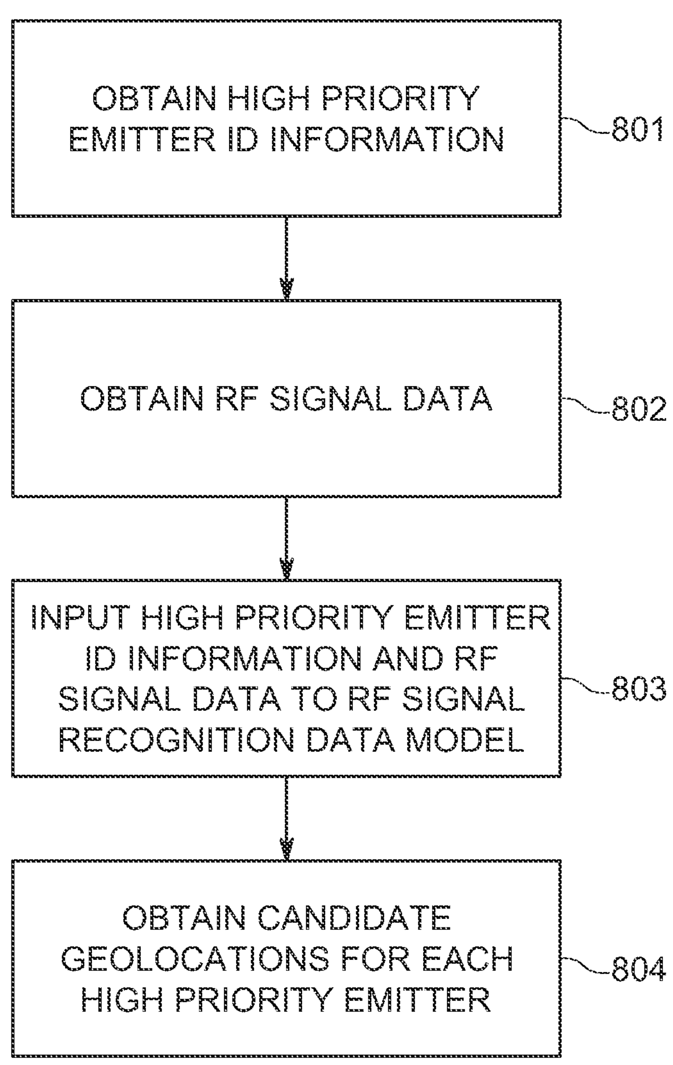
FIG. 8 is a flowchart illustrating a method for identifying a high-priority emitter from a collection of RF signal data.

FIG. 8 is a flowchart illustrating a method 800 for identifying high-priority emitters from a collection of RF signal data in order for the system to rapidly converge on identifying one or more candidate emitters.

Referring to FIG. 8, at 801, the method 800 may include obtaining high-priority emitter identity information. For example, with reference to FIG. 2, the RF signal analysis engine 205 may obtain the high-priority emitter identity information from an external source that indicates one or more high-priority emitter identities. For example, the RF signal analysis engine 205 may obtain the high-priority emitter identity information from a user input. However, the disclosure is not limited thereto, and as such, the high-priority emitter identity information may be input in various other manner.

At 802, the method 800 may include obtaining RF signal data. For example, with reference to FIG. 2, the RF signal analysis engine 205 may obtain a collection of RF signals received by a sensing device (e.g., sensing device 102 in FIG. 1).

At 803, the method 800 may include inputting the high-priority emitter identity information and the RF signal data into a generated RF signal recognition data model 305, as illustrated in FIG. 3.

At 804, the method 800 may include obtaining an output of the RF signal recognition data model. According to an embodiment, the output may include predicted geolocations for each of the high-priority emitters.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As discussed above, systems and techniques described herein can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

obtaining radio frequency (RF) signals emitted by one or more emitters;

processing the RF signals using a deinterleaving operation that integrates geolocation information from one or more receivers that detect at least a portion of the RF signals;

determining, based on the deinterleaving operation, a first grouping of RF signals that indicate an association with a first emitter of the one or more emitters;

generating iterative sets of labeled training data comprising a respective label for RF signal inputs derived from the first grouping of RF signals;

generating an RF signal recognition model based on machine-learning performed using the iterative sets of labeled training data; and based on detection of a new RF signal by a receiver, determining, by the RF signal recognition model, an identity of the first emitter of the RF signal.

2. The method of claim 1, wherein determining the first grouping of RF signals comprises:

determining a grouping of time-adjacent RF signal bursts based on the deinterleaving operation.

3. The method of claim 2, further comprising:

generating a second grouping of RF signal bursts in response to fusing respective groups of time-adjacent RF signal bursts that are collected during a given pass of a sensing device.

4. The method of claim 3, wherein the second grouping of RF signal bursts is generated based on application of the deinterleaving operation to information derived from one or more ensemble feature extractors.

5. The method of claim 2, wherein determining the first grouping of RF signals comprises:

determining a grouping of RF signals based on deinterleaving, geolocation and assignation processes performed on the obtained RF signals.

6. The method of claim 5, wherein determining the first grouping of RF signals comprises:

determining a grouping of RF signals based on an assignation process that identifies a subset of RF signal bursts for which an associated geolocation resolves to a particular emitter identity label.

7. The method of claim 1, wherein determining a grouping of RF signals comprises:

determining a grouping of RF signals that represents an initial set of labeled inputs that is processed by the RF signal recognition model as a step in training the RF signal recognition model to determine an identity of the first emitter.

8. The method of claim 1, wherein the geolocation information integrated with the deinterleaving operation comprises:

for each of the one or more receivers:

geospatial measurements comprising a respective time-varying position measurement and a respective velocity measurement for the receiver.

9. The method of claim 1, wherein generating iterative sets of labeled training data comprises:

generating a first labelled dataset comprising a respective label for each respective RF signal in a set of RF signals; and generating a second labelled dataset, different from the first labelled dataset, based on machine-learning computations performed using the respective labels for each RF signal in the first grouping of RF signals.

10. The method of claim 9, wherein generating the RF signal recognition model comprises:

generating the RF signal recognition model based on machine-learning performed using the iterative sets of labeled training data.

11. The method of claim 1, wherein the RF signal recognition model is optimized to perform unique signal recognition of emitter-based RF energies; and determine, based on the unique signal recognition that is performed, a respective identity of emitters that emit RF energy.

12. An apparatus comprising:

a volatile or non-volatile memory storing one or more instructions; and at least one processor configured to execute the one or more instructions to:

obtain radio frequency (RF) signals emitted by one or more emitters;

process the RF signals using a deinterleaving operation that integrates geolocation information from one or more receivers that detect at least a portion of the RF signals;

determine, based on the deinterleaving operation, a grouping of RF signals that indicate an association with a first emitter of the one or more emitters;

generate iterative sets of labeled training data comprising a respective label for RF signal inputs derived from the grouping of RF signals;

generate an RF signal recognition model based on machine-learning performed using the iterative sets of labeled training data; and based on detection of a new RF signal by a receiver, determine, by the RF signal recognition model, an identity of the first emitter of the RF signal.

13. The apparatus of claim 12, wherein the at least one processor is further configured to:

determine a grouping of time-adjacent RF signal bursts based on the deinterleaving operation.

14. The apparatus of claim 12, wherein the at least one processor is further configured to:

determine a grouping of RF signals that represents an initial set of labeled inputs that is processed by the RF signal recognition model as a step in training the RF signal recognition model to determine a respective geolocation of the first emitter.

15. The apparatus of claim 12, wherein the at least one processor is further configured to:

generate a first labelled dataset comprising a respective label for each respective RF signal in the grouping of RF signals; and generate a second labelled dataset, different from the first labelled dataset, based on machine-learning computations performed using the respective labels for each RF signal in the grouping of RF signals.

16. A non-transitory computer readable medium containing a program and operative to be read and executed by the computer, the program comprising code to implement the method as recited in claim 1.

* * * * *